United States Patent Office 3,661,867
Patented May 9, 1972

3,661,867
METHOD FOR PRODUCING CHLORIDE BY SUSPENSION POLYMERIZATION
Shunichi Koyanagi, Hajime Kitamura, Kinya Ogawa, and Shigenobu Tajima, Naoetsu-shi, Japan, assignors to Shinetsu Chemical Company
No Drawing. Filed Dec. 10, 1970, Ser. No. 96,977
Claims priority, application Japan, Dec. 15, 1969, 44/100,787
Int. Cl. C08f *1/11, 3/30*
U.S. Cl. 260—78.5 CL — 7 Claims

ABSTRACT OF THE DISCLOSURE

A dialkyl peroxydicarbonate whose alkyl radical has 1–8 carbon atoms, an acetyl cyclohexyl sulfonyl peroxide or a mixture thereof is added to vinyl chloride or a mixture of vinyl monomers having vinyl chloride as its main component. 0.001–0.5% by weight, based on the weight of the monomer(s), of the dialkyl peroxydicarbonate, acetylcyclohexyl sulfonyl peroxide or mixture thereof is added. The resultant mixture is maintained at a temperature not exceeding 35° C. for 0.5 to 2 hours. The pH is adjusted to 8–11. The resultant mixture is heated at 40–70° C. in the presence of a polymerization initiator to substantially complete the polymerization. The initiator is selected from the group consisting of azobis-2,4-dimethylvaleronitrile, azobismethoxyvaleronitrile, azobistrimethylvaleronitrile, ter-butylperoxypivalate and mixtures thereof. The method substantially prevents polymer scale deposition on the interior walls of the polymerization vessel. The polymerization induction period is eliminated. The polyvinyl chloride produced has little color and has superior thermal stability.

---

This invention relates to an improved method for suspension-polymerizing vinyl chloride in an aqueous medium. The method of the persent invention substantially prevents the deposition of polymer scale on the inner walls of the polymerization vessel. Moreover, the method enables one to readily produce with high efficiency a polyvinyl chloride which has superior thermal stability and little color.

In recent years the demand for polyvinyl chloride prepared by suspension polymerization as a resin for general use has greatly increased. How to increase its production by improving the efficiency of the polymerization vessel is an important technical problem. The use of a polymerization initiator having an extremely high activity, such as diisopropyl peroxydicarbonate or acetylcyclohexyl sulfonyl peroxide, has been tried. However, when such a polymerization initiator is used in a large quantity, the reaction which takes place is too violent to control. This adversely affects the uniformity of the degree of polymerization, the particle size distribution, the rate of gelation, and the thermal stability of the polyvinyl chloride produced.

If the amount of polymerization initiator utilized is reduced to permit the reaction to be controlled, the initiator will be consumed before the reaction reaches a high conversion rate, and the polymerization will not proceed further. Moreover, such an initiator having high activity is itself a strong oxidizing agent. It will react with the vinyl chloride monomer which is undergoing polymerization and with the polyvinyl chloride product to generate hydrogen chloride. This increases polymer scale deposition on the inner walls of the polymerization vessel. Furthermore it may mix with the polyvinyl chloride product and accelerate the decomposition of the polymer with more hydrogen chloride being generated which in turn promotes the thermal decomposition of the product.

While suspension polymerization of vinyl chloride monomer is being carried out, even a small amount of impurities such as saturated hydrocarbons, e.g., methane and ethane; olefins, e.g., ethylene and propylene; chlorinated hydrocarbons, e.g., methyl chloride, methylene chloride and dichloroethane; and various dienes, if present in the vinyl chloride monomer, will act to inhibit or retard the polymerization. The presence of such impurities increases the induction period before the start of polymerization to as long as several hours. In such a case, even if the polymerization begins at the end of the induction period, the reaction will proceed very slowly. Moreover after the rate of polymerization reaches 30 to 50%, the reaction sometimes suddenly accelerates. This results in a remarkable reduction in the efficiency of the polymerization vessel and in the deterioration in quality of the polyvinyl chloride produced.

The method of the present invention has completely solved the above described problem. The method consists of the following steps: (1) adding dialkylperoxy dicarbonate, whose alkyl radical has from 1 to 8 carbon atoms, and/or acetylcyclohexylsulfonylperoxide to an aqueous medium containing vinyl chloride or a mixture of vinyl monomers having vinyl chloride as its main component, in an amount of from 0.001 to 0.5% by weight based on the weight of the monomer, and keeping the system at a temperature not exceeding 35° C. for 0.5 to 2 hours, (2) adding to the system an alkaline substance so that the pH of the system is kept between 8 and 11, and (3) heating the system at a temperature between 40° and 70° C. in the presence of at least one polymerization initiator selected from the group consisting of azobis-2,4-dimethylvaleronitrile, azobismethoxyvaleronitrile, azobistrimethylvaleronitrile and ter-butylperoxypivalate, thereby substantially completing polymerization.

This invention is based on our findings that: (a) the particle size of the polyvinyl chloride that is produced depends upon the particle size of the polymer formed in the polymerization system when the rate of conversion has reached approximately a point between 10 and 30%, (b) the deposition of polymer scale on the inner walls of the polymerization vessel is mainly due to the presence of chloride ion in the polymerization system. Further, if the chloride ion is neutralized with alkali before the rate of conversion reaches 10%, polymer scale deposition will be substantially prevented. If, however, the polymerization system is made alkaline before the polymerization starts, the particle size of the polyvinyl chloride will be adversely affected and (c) although the above-mentioned dialkylperoxy dicarbonate and acetylcyclohexyl sulfonyl peroxide will be immediately decomposed in an alkaline system and cease to function as initiators and oxidizing agents, the azobisvaleronitrile and ter-butylperoxypivalate will be stable. The method of the present invention not only prevents polymer scale deposition, it also prevents the problems caused by the presence of the various impurities contained in the monomer(s). Consequently polyvinyl chloride of superior quality can be prepared effciently and with ease.

The method of the present invention will now be described in greater detail. In the first step of the method an aqueous medium containing vinyl chloride monomer is mixed with from 0.001 to 0.5% by weight, based on the weight of the monomer, of a dialkylperoxy dicarbonate whose alkyl radical has from 1 to 8 carbon atoms and/or acetylcyclohexyl sulfonyl peroxide, and stirred for 0.5 to 2 hours at a temperature not exceeding 35° C. Various impurities contained in the monomer are decomposed by the oxidizing action of the dialkylperoxy dicarbonate and/or acetylcyclohexyl sulfonyl peroxide, and will no longer act as polymerization inhibitors or retarders. Therefore the induction period which heretofore has been considered to be an unavoidable disadvantage in the polymerization of vinyl chloride is obviated along with the various problems caused by it. If the temperature is too high, dialkylperoxydicarbonate and acetylcyclohexyl sulfonyl peroxide will act as polymerization initiators and will make the polymerization proceed rapidly. Therefore the temperature should be at most 35° C. If the stirring is conducted for a period shorter than 0.5 hour, the removal of the impurities will be incomplete. If the stirring is conducted for a period longer than 2 hours, even if the temperature is not above 35° C., the polymerization may proceed and make efficient use of the polymerization vessel impossible. Thus the length of time for stirring should be between 0.5 and 2 hours. Any peroxide having high activity which can quickly decompose the impurities contained in the monomer may be used in this process. As the dialkylperoxy dicarbonate whose alkyl radical has from 1 to 8 carbon atoms, diethylperoxy dicarbonate diisopropylperoxy dicarbonate, and dioctylperoxy dicarbonate are preferred. Such a peroxide is added in the amount of from 0.001 to 0.5% by weight based on the weight of the monomer.

The aqueous medium containing the vinyl chloride monomer which has been treated as described above is acidified by the decomposition of the impurities, especially of the various chlorides contained in the monomer and/or by hydrogen chloride which is generated by the decomposition of the vinyl chloride monomer due to the presence of the peroxide. Therefore in the second step, an alkaline substance such as for example caustic potash, caustic soda, sodium carbonate, sodium bicarbonate, calcium hydroxide or sodium phosphate is added to the medium in an amount sufficient to bring the pH within the range of 8 to 11. When the pH of the medium is raised above 8, there will be no chloride ion, which is the main cause of the generation of polymer scale, in the system. Furthermore, the catalyst having high activity which tends to react with the vinyl chloride monomer or polyvinyl chloride to generate chloride ion and which was added in the first step is easily decomposed and loses its activity under alkaline conditions. As a result, polymer scale deposition will be prevented and the thermal stability of the polyvinyl chloride product will be improved. The above referred to alkaline substance should be added before the rate of conversion is above 10%, otherwise there will not be sufficient prevention of polymer scale deposition. The amount of alkaline substance employed should be as low as possible to bring the pH of the aqueous phase to between 8 and 11, because, if it is used in excess, it will have an unfavorable effect on the rate of gelation and on the particle size distribution of the polyvinyl chloride produced.

In the third step of the method of the present invention, after having completed the second step, polymerization of the vinyl chloride is substantially completed. Suspension polymerization of vinyl chloride is carried out in the presence of a polymerization initiator selected from the group consisting of azobis-3,4-dimethylvaleronitrile, azobismethoxyvaleronitrile, azobistrimethylvaleronitrile and ter-butylperoxypivalate. When such a polymerization initiator is employed, the polymerization proceeds quite rapidly and with comparatively uniform velocity. In fact, the use of such a polymerization initiator, in the absence of impurities contained in the monomer, enables the polymerization to proceed much more rapidly and more uniformly, so that even if one takes into consideration the stirring time of from 0.5 to 2 hours, the rate of operation of the polymerization vessel is greatly improved. The amount of the polymerization initiator to be added is from 0.001 to 0.5% by weight based on the weight of the monomer. Since the polymerization initiator is stable even in an aqueous medium having a pH of from 8 to 11, it may be added either in the first step, second step, or immediately before the start of the third step.

The remaining polymerizing conditions under which the third step is to be conducted are the same as are ordinarily employed. Consequently, as a suspending agent one can employ a member selected from synthetic or natural water-soluble high molecular substances such as polyvinyl alcohol, various kinds of water-soluble cellulose derivatives, vinyl acetate-maleic anhydride copolymer, gelatin and starch. If necessary, the suspending agent can be coupled with various kinds of solvents which are used as molecular-weight controlling agents. To carry out the polymerization, the mixture is then stirred at 40–70° C. The suspending agent can be added at any time during the process, e.g., in the first, second, or the third step.

Although in the above description only the polymerization of vinyl chloride to vinyl chloride polymer was referred to, the method of the instant invention is applicable to the production of a copolymer containing vinyl chloride as its main component. Such monomers as can be copolymerized with vinyl chloride are exemplified by various kinds of vinyl esters, vinyl ether, aromatic vinyl, acrylic or methacrylic ester, maleic ester, and α-olefin.

In the following examples and controls, all parts referred to are parts by weight, the names of the additives are abbreviated as given below, and the physical properties of the (co)polymers were determined by the methods described hereunder.

ACSP—Acetyl cyclohexylsulfonyl peroxide
IPP—Diisopropyl peroxydicarbonate
DMVN—Azobis-2,4-dimethylvaleronitrile
MDVN—Azobismethoxyvaleronitrile
BPP—Ter-butylperoxypivalate (1) Rate of gelation: A mixture of 100 parts by weight of vinyl chloride (co)polymer, 1 part of tribasic lead sulfate, 1.5 parts of lead stearate, and 0.7 part of barium stearate, totalling 65 g., was placed into a plastograph equipped with a mixing chamber having an inner capacity of 50 cc. The mixture was then kneaded at 185° C. The time at which the mixture gave the maximum torque was used to denote the rate of gelation of the vinyl chloride (co)polymer.

(2) Initial color: The same mixture as was employed in determining the rate of gelation was kneaded for 7 minutes on a roll kept at 180° C. It was then processed into a sheet. The color of the sheet was employed to denote the initial color of the vinyl chloride (co)polymer.

(3) Thermal stability: The sheet prepared for determining the initial color described under (2) was heated in Gear's oven at 185° C. The time which elapsed before the sheet blackened was utilized to show the thermal stability of the vinyl chloride (co)polymer.

Control: A catalyst and 200 parts of water in which was dissolved 0.1 part of partially saponified polyvinyl acetate was placed in a stainless steel polymerization vessel having a capacity of 1,000 liters. The interior of the vessel was then placed under vacuum, after which 100 parts of vinyl chloride monomer were added to the vessel. Then the temperature in the vessel was raised until it reached a certain point and while the temperature was maintained constant, the polymerization of the mixture was carried out. The polymerization was stopped only after the inside pressure was reduced. A study of the physical properties of the polymers thus prepared showed the effect of various initiators on the polymerization reaction and on the quality of the product produced. The results obtained are shown in the following Table 1. The length of the induction period was calculated from the calorific values of polymerization obtained by measurement.

TABLE 1

| | Control Number | | | | | | | |
|---|---|---|---|---|---|---|---|---|
| | 1 ACSP | 2 IPP | 3 DMVN | 4 BPP | 5 ACSP | 6 IPP | 7 DMVN | 8 BP |
| Polymerization conditions: | | | | | | | | |
| Amount of initiator added (percent) | 0.04 | 0.05 | 0.12 | 0.15 | 0.011 | 0.013 | 0.022 | 0.025 |
| Temperature (° C.) | 35 | 35 | 35 | 35 | 57 | 57 | 57 | 57 |
| Induction period (hrs.) | 1.0 | 1.5 | 3.5 | 3.5 | 0.5 | 1.0 | 2.5 | 2.5 |
| Polymerization time (hrs.) | 15 | 15 | 15 | 15 | 15 | 15 | 10 | 10 |
| Results: | | | | | | | | |
| Degree of polymerization | 2,800 | 2,800 | 2,900 | 3,000 | 1,050 | 1,050 | 1,050 | 1,050 |
| Particle size distribution: | | | | | | | | |
| 60 mesh thru (percent) | 99.8 | 99.8 | 100 | 100 | 98.1 | 100 | 100 | 100 |
| 100 mesh thru (percent) | 62.2 | 51.9 | 68.9 | 65.8 | 42.2 | 43.8 | 50.1 | 41.1 |
| 200 mesh thru (percent) | 0.8 | 0.6 | 1.8 | 1.2 | 0.9 | 0.8 | 0.1 | 0.3 |
| Thermal stability (mins.) | 60 | 80 | 100 | 100 | 80 | 80 | 100 | 100 |
| Initial color | Poor | Poor | (1) | (1) | Poor | Poor | (1) | (1) |
| Rate of gelation (mins.) | | | | | 17 | 17 | 18 | 18 |
| pH of the system at the end of the polymerization | 3.0 | 3.0 | 3.2 | 3.2 | 3.0 | 3.1 | 3.1 | 3.1 |
| Amount of polymer scale deposited (g./cm.²) | 110 | 110 | 110 | 110 | 110 | 105 | 100 | 105 |

[1] Fair to poor.

EXAMPLES 1–3

0.05 part of IPP and 200 parts of water in which was dissolved 0.1 part of hydroxypropyl methylcellulose were placed into a stainless steel polymerization vessel having a capacity of 1,000 liters. The interior of the vessel was then placed under vacuum after which 100 parts of vinyl chloride monomer were added to the vessel. The mixture thus prepared was stirred at 30° C. for 1 hour. An aqueous solution of caustic potash was then added to the mixture to bring the pH of the aqueous phase to 11. An additional 0.15 part of mineral spirit solution containing 25% of BPP was added to the vessel and inside temperature of the vessel was raised to 50° C. The polymerization of the mixture was conducted at this temperature until the pressure inside the vessel became 5.5 kg./cm.², at which point the polymerization was stopped. The contents of the vessel were then dehydrated and dried. Polyvinyl chloride was thereby obtained. The polymerization conditions and the results obtained are given in the following Table 2.

EXAMPLES 4–6

An amount of ACSP as shown in the following Table 3, 200 parts of water in which were dissolved 0.06 part of partially saponified polyvinyl acetate and 0.04 part of methyl cellulose were placed in a stainless steel polymerization vessel having a capacity of 1,000 liters. The inside of the vessel was placed under vacuum after which 100 parts of vinyl chloride monomer were added to the vessel. Then the mixture was stirred at 20° C. for 1 hour. Subsequently, the pH of the aqueous phase was adjusted to 10.8 by the addition of a 25% aqueous solution of caustic soda. 0.1 part of a toluene solution containing 25% of DMVN was then added and the temperature inside the vessel was raised. The polymerization was carried out at 57° C. When the interior pressure reached 5.5 kg./cm.², the polymerization was stopped and the contents of the vessel were dehydrated and dried, whereby

TABLE 2

| | Examples | | | Controls | |
|---|---|---|---|---|---|
| Experiment Number | 1 | 2 | 3 | 9 | 10 |
| Amount of IPP added (percent) | 0.05 | 0.05 | 0.05 | None | 0.05 |
| Neutralization conditions: | | | | | |
| Stirring time (hrs.) | 0.5 | 1 | 2 | | 5 |
| Rate of conversion (percent) | 1.0 | 4.0 | 8.0 | | 18.0 |
| Results: | | | | | |
| Degree of polymerization | 1,500 | 1,500 | 1,500 | 1,500 | 1,400 |
| Particle size distribution: | | | | | |
| 60 mesh thru (percent) | 100 | 100 | 100 | 100 | 99.2 |
| 100 mesh thru (percent) | 50 | 48.2 | 55.3 | 58.2 | 31.8 |
| 200 mesh thru (percent) | 3.5 | 1.8 | 3.2 | 3.1 | 3.1 |
| Thermal stability (mins.) | 100 | 100 | 100 | 100 | 90 |
| Initial color | Good | Good | Good | (1) | (1) |
| Rate of gelation (mins.) | 20 | 20 | 20 | 20 | 19 |
| pH of the system at the end of the polymerization | 8.3 | 8.3 | 8.3 | 3.0 | 8.0 |
| Amount of polymer scale deposited (g./m.²) | 0 | 0 | 0 | 110 | 90 |
| Total polymerization time (hrs.) | 8 | 8.5 | 9 | 10 | 6 |

[1] Fair to poor.

Thus, by the method of the invention, the deposition of polymer scale was completely prevented. Furthermore, the total polymeriaztion time was between 8 and 9 hours. In contrast thereto, a considerable amount of polymer scale was observed to be deposited in Controls 9 and 10.

polyvinyl chloride was obtained. The amount of ACSP, the neutralization conditions, the properties of the products and the amounts of polymer scale deposited on the inner walls of the polymerization vessel were as shown in the following Table 3.

TABLE 3

| | Control | Examples | | | Control |
|---|---|---|---|---|---|
| Experiment Number | 11 | 4 | 5 | 6 | 12 |
| Amount of ACSP added (percent) | | 0.05 | 0.1 | 0.5 | 1.0 |
| Neutralization conditions: | | | | | |
| Stirring time (hrs.) | | 1 | 1 | 1 | 1 |
| Rate of conversion (percent) | | 0.5 | 1 | 6 | 14 |
| Results: | | | | | |
| Degree of polymerization | 1,050 | 1,050 | 1,050 | 1,050 | 1,030 |
| Particle size distribution: | | | | | |
| 60 mesh thru (percent) | 100 | 100 | 100 | 100 | 99.3 |
| 100 mesh thru (percent) | 52.3 | 48.2 | 51.2 | 55.8 | 51.8 |
| 200 mesh thru (percent) | 0.1 | 0.3 | 0.5 | 0.2 | 1.0 |
| Thermal stability (mins.) | 100 | 100 | 100 | 100 | 80 |
| Initial color | Poor | Good | Good | Good | Poor |
| Rate of gelation (mins.) | 18 | 18 | 18 | 18 | 17 |
| pH of the system at the end of the polymerization | 3.0 | 10.5 | 10.5 | 10.5 | 10.0 |
| Amount of polymer scale deposited (g./m²) | 105 | 0 | 0 | 0 | 80 |
| Total polymerization time (hrs.) | 11 | 9.5 | 9 | 9 | 7 |

EXAMPLES 7 AND 8

The polymerization was conducted as described in Examples 4-6, except that DMVN was added to the system not after but together with the ACSP. The results obtained are set forth in the following Table 4.

TABLE 4

| Example number | 7 | 8 |
|---|---|---|
| Amount of ACSP added (percent) | 0.05 | 0.5 |
| Neutralization conditions: | | |
| Stirring time (hrs.) | 1 | 1 |
| Rate of conversion (percent) | 0.5 | 6 |
| Results: | | |
| Degree of polymerization | 1,050 | 1,050 |
| Particle size distribution: | | |
| 60 mesh thru (percent) | 100 | 100 |
| 100 mesh thru (percent) | 51.2 | 49.8 |
| 200 mesh thru (percent) | 0.8 | 1.1 |
| Thermal stability (mins.) | 100 | 100 |
| Initial color | Good | Good |
| Rate of gelation (mins.) | 18 | 18 |
| pH of the system at the end of the polymerization | 10.3 | 10.5 |
| Amount of polymer scale deposited (g./m.²) | 0 | 0 |
| Total polymerization time (hrs.) | 9.5 | 9 |

EXAMPLE 9

Experiments were conducted as described in Examples 1, 2 and 3, except that instead of the BPP catalyst, 0.015 part of DMVN and 0.01 part of MDVN were employed. The results obtained are set forth in the following Table 5.

TABLE 5

| | |
|---|---|
| Amount of DMVN added (percent) | 0.015 |
| Amount of MDVN added (percent) | 0.01 |
| Neutralization conditions: | |
| Stirring time (hrs.) | 2 |
| Rate of conversion (percent) | 3 |
| Results: | |
| Degree of polymerization | 1500 |
| Particle size distribution— | |
| 60 mesh thru (percent) | 100 |
| 100 mesh thru (percent) | 50.2 |
| 200 mesh thru (percent) | 1.1 |
| Thermal stability (mins.) | 100 |
| Initial color | Good |
| Rate of gelation (mins.) | 20 |
| pH of the system at the end of the polymerization | 10.2 |
| Amount of polymer scale deposited (g./m.²) | 0 |
| Total polymerization time (hrs.) | 9.0 |

What is claimed is:

1. A method for the suspension polymerization of vinyl chloride or a mixture of vinyl monomers having vinyl chloride as its main component, in an aqueous medium, comprising the steps of adding 0.001–0.5% by weight, based on the weight of the monomer(s), of a dialkylperoxydicarbonate whose alkyl radical has 1–8 carbon atoms, or acetylcyclohexylsulfonyl peroxide or a mixture of said dialkylperoxydicarbonate and said acetylcyclohexylsulfonyl peroxide to produce a resultant mixture; maintaining the resultant mixture at a temperature not exceeding 35° C. for 0.5 to 2 hours; adjusting the pH of the resultant mixture to from 8 to 11 before the rate of conversion of the monomer to polymer is above 10%; and then heating the pH-adjusted resultant mixture at from 40° to 70° C. in the presence of a polymerization initiator selected from the group consisting of azobis-2,4-dimethylvaleronitrile, azobismethoxyvaleronitrile, azobistrimethylvaleronitrile, terbutylperoxypivalate and mixtures thereof to substantially complete said polymerization.

2. A method for reducing polymer scale deposition in the production of polyvinyl chloride by suspension polymerization of vinyl chloride or a mixture of vinyl monomers having vinyl chloride as its main component in an aqueous medium, comprising the steps of adding 0.001–0.5% by weight, based on the weight of the monomer(s), of a dialkylperoxydicarbonate whose alkyl radical has 1–8 carbon atoms, or acetylcyclohexyl sulfonyl peroxide or a mixture of said dialkylperoxydicarbonate and said acetylcyclohexylsulfonyl peroxide to produce a resultant mixture; maintaining the resultant mixture at a temperature not exceeding 35° C. for 0.5 to 2 hours; adjusting the pH of the resultant mixture to from 8 to 11 before the rate of conversion of the monomer to polymer is above 10%; and then heating the pH-adjusted resultant mixture at from 40° to 70° C. in the presence of a polymerization initiator selected from the group consisting of azobis-2,4-dimethylvaleronitrile, azobismethoxyvaleronitrile, azobistrimethylvaleronitrile, ter-butylperoxypivalate and mixtures thereof to substantially complete said polymerization.

3. The method as described in claim 1 wherein said dialkylperoxydicarbonate is diethylperoxydicarbonate, diisopropylperoxydicarbonate or dioctylperoxydicarbonate.

4. The method as described in claim 1 wherein the pH of the resultant mixture is adjusted by adding thereto an alkaline material selected from the group consisting of caustic potash, caustic soda, sodium carbonate, sodium bicarbonate, calcium hydroxide and sodium phosphate in an amount sufficient to bring the pH within said range of 8–11.

5. The method as claimed in claim 1 wherein said polymerization initiator is present in an amount of from 0.001 to 0.5% by weight based on the weight of the monomers.

6. The method as claimed in claim 1 wherein said polymerization initiator is added to the resultant mixture before said heating at 40–70° C.

7. The method as described in claim 1 wherein said monomers in said mixture of vinyl monomers having vinyl chloride as its main component are selected from the group consisting of vinyl esters, vinyl ethers, aromatic vinyl, acrylic ester, methacrylic ester, maleic ester and α-olefin.

References Cited

UNITED STATES PATENTS

| 2,975,161 | 3/1961 | Abramo et al. | 260—92.8 W |
| 3,205,204 | 9/1965 | Heckmaier et al. | 260—92.8 W |
| 3,375,238 | 3/1968 | Bauer et al. | 260—92.8 W |
| Re. 25,763 | 4/1965 | Marous et al. | 260—92.8 W |
| 3,592,800 | 7/1971 | Oschmann et al. | 260—92.8 W |
| 2,576,720 | 11/1951 | Marks | 260—92.8 W |

OTHER REFERENCES

Shenblat et al., Polymerization of Vinyl Bromide in Solution, J. of Polymer Science, vol. XXXVIII, pp. 189–204 (1959).

JOSEPH L. SCHOFER, Primary Examiner

J. A. DONNOHUE, Jr., Assistant Examiner

U.S. Cl. X.R.

260—86.3, 87.1, 87.5 R, 87.5 C, 87.5 G, 92.8 W

UNITED STATES PATENT OFFICE
CERTIFICATE OF CORRECTION

Patent No. 3 661 867          Dated May 9, 1972

Inventor(s) Shunichi Koyanagi, et al.

It is certified that error appears in the above-identified patent and that said Letters Patent are hereby corrected as shown below:

The correct title of the patent is:

-- METHOD FOR PRODUCING POLYVINYL CHLORIDE BY SUSPENSION POLYMERIZATION. --

Signed and sealed this 29th day of October 1974.

(SEAL)
Attest:

McCOY M. GIBSON JR.          C. MARSHALL DANN
Attesting Officer          Commissioner of Patents